US006498795B1

(12) United States Patent
Zhang et al.

(10) Patent No.: US 6,498,795 B1
(45) Date of Patent: Dec. 24, 2002

(54) METHOD AND APPARATUS FOR ACTIVE INFORMATION DISCOVERY AND RETRIEVAL

(75) Inventors: Junbiao Zhang, Somerset, NJ (US); Maximilian Ott, Pennington, NJ (US)

(73) Assignee: NEC USA Inc., Princeton, NJ (US)

( * ) Notice: Subject to any disclaimer, the term of this patent is extended or adjusted under 35 U.S.C. 154(b) by 0 days.

(21) Appl. No.: 09/321,628

(22) Filed: May 28, 1999

Related U.S. Application Data

(60) Provisional application No. 60/108,989, filed on Nov. 18, 1998.

(51) Int. Cl.[7] .............................................. H04L 12/56
(52) U.S. Cl. ....................... 370/400; 709/218; 709/219; 709/242
(58) Field of Search ................................ 370/255, 256, 370/395.31, 395.32, 400, 408, 411, 428; 709/218, 219, 242

(56) References Cited

U.S. PATENT DOCUMENTS

| | | | | |
|---|---|---|---|---|
| 5,953,718 A | * | 9/1999 | Wical | 707/5 |
| 6,178,416 B1 | * | 1/2001 | Thompson et al. | 707/3 |
| 6,192,364 B1 | * | 2/2001 | Baclawski | 707/10 |
| 6,263,335 B1 | * | 7/2001 | Paik et al. | 707/5 |
| 6,282,537 B1 | * | 8/2001 | Madnick et al. | 707/4 |
| 6,292,894 B1 | * | 9/2001 | Chipman et al. | 713/168 |
| 6,295,535 B1 | * | 9/2001 | Radcliffe et al. | 707/10 |
| 6,363,378 B1 | * | 3/2002 | Conklin et al. | 707/5 |
| 6,370,542 B1 | * | 4/2002 | Kenyon | 707/104 |
| 6,389,409 B1 | * | 5/2002 | Horovitz et al. | 707/2 |
| 6,424,973 B1 | * | 7/2002 | Baclawski | 707/102 |

OTHER PUBLICATIONS

Huhns, M.N. et al "Ontologies for Agents" IEEE Internet Computing, vol. 1, Issue 6, Nov.–Dec. 1997, pp. 81–83.*
Kebreau, S. et al "Modelling Intelligent Agents for Information Filtering" Electrical and Computer Engineering, vol. 2, May 24–28, 1998, pp. 569–572.*
Mahalingam, K. et al "A Tool for Organizing Web Information" Computer, vol. 30, Issue 6, Jun. 1997, pp. 80–83.*
Jonghyun K. et al "Dynamic Classificational Ontologies for Discovery in Cooperative Federated Databases" Cooperative Information Systems, Jun. 19–21, 1996, pp. 26–35.*

* cited by examiner

*Primary Examiner*—Hassan Kizou
*Assistant Examiner*—Anh-Vu H Ly
(74) *Attorney, Agent, or Firm*—Sughrue Mion, PLLC

(57) ABSTRACT

The present invention is built upon an active network framework and an ontology-based information hierarchy, and, in addition to the features found in current network models, it provides a symmetrical framework for information filtering and binding in the network. Queries from information requesters are directly routed to relevant information sources and contents from information providers are distributed to the destinations that expressed an interest in the information. The query packets and content packets can carry commands that are executed at the active network nodes encountered by the packets as they traverse the network.

55 Claims, 13 Drawing Sheets

METHOD AND APPARATUS FOR ACTIVE INFORMATION DISCOVERY AND RETRIEVAL

CROSS-REFERENCES TO RELATED APPLICATIONS

This application is an application filed under 35 U.S.C. § 111(a), claiming benefit pursuant to 35 U.S.C. § 120 of the filing date of the Provisional Application Ser. No. 60/108,989 filed on Nov. 18, 1998, pursuant to 35 U.S.C. § 111(b). The Provisional Application Ser. No. 60/108,989 is incorporated herein by reference for all it discloses.

BACKGROUND OF INVENTION

1. Field of Invention

This invention is related to searching for information, specifically to an architecture for searching for information contained within a computer system or within a plurality of interconnected computers. The present invention is embodied in a network architecture, a system, a method and a computer program product for searching for information contained within a plurality of interconnected computers.

2. Description of Related Art

As usage of networked computers continues to rapidly increase, more and more information is accessible at an ever-growing pace. However, such an information explosion makes it ever harder for users to find what they are looking for. In particular, certain fundamental problems exist in the current Web that make the information retrieval process lengthy, inflexible and human dependent:

- Only the computers at the network edges participate in content storage and user interactions. Information retrieval paths (and thus delays) are usually long (e.g., a user has to go through several possibly remote search engines before reaching the site of interest).
- Because documents generally have no semantic structures, information retrieval processes are hard to automate. Users must manually sift through the search results, many of which are irrelevant.
- The commercial operational model of the search engines and portal sites dictates the lack of an open, standard interface among the competitors. This means that it is virtually impossible for users to specify customized searches (e.g., searches which aim at specific categories with special requirements on category related fields).
- Given the "crawling" operation model of the search engines, the coverage of any single engine is greatly limited. It has been reported in the literature that less than thirty percent of the material available on the Web has been accessed by search engines. Further, it is extremely time-consuming, if not impossible, for these engines to respond to information updates, resulting in a large percentage of stale links in their indices.

FIG. 1 illustrates the current search operational model. By way of example, the current search operational model treats the Internet as a packet routing black box and puts most of the intelligence outside the network. A client explicitly requests an information item in the form of a Uniform Resource Location (hereinafter "URL").

As shown in FIG. 1, multiple client stations are linked across the Web via routers (not shown) to various servers. The servers contain information that is desired by the client stations. However, a search engine is usually necessary for the client stations to discover the information that is contained on the servers.

Search engines and portals such as AltaVista®, Yahoo®, and Infoseek® are used as the major means to find information on the Web. These search engines work as indexing databases that are built through exhaustive probing of content providers. Such an operation model, although it successfully helped the Internet reach its current status, has been proven to be inadequate in discovering information. As discussed above, a more desirable search operational model should have the necessary structure and mechanisms for information routing.

Referring to FIG. 2, a conventional routing table is built upon reachability information that is relatively stable and manageable. As data packet 10 traverses through the network, it consults the routing table at each router. When the packet reaches the first router 11, the router reads the packet header, and consults its routing table 16 for the appropriate link. This process is repeated at the second router 13. The data packet 10 provides no information other than its destination, and the router nodes take no further action other than to route the data packet to its desired destination.

Generally, search engines operate by constructing a large database containing links to documents or pages present on servers connected to the Internet. To reach a particular page or document, one must follow the links from a particular starting point. The path to a particular page or document is lost if a link in the path is inoperable or otherwise removed. Building a table of reachable information at each node is impossible not only in terms of space, but in terms of time: by the time such a table is constructed, the information may already become obsolete.

If an information provider wants to inject information into the Internet, the location of that information must be registered with a search engine in order for the search engine to return to that information. The search engine, however, may overlook that particular information due to the sheer size of the Internet, or the search engine may refuse to register the information in its database for some reason.

A more flexible search operational model utilizing more effective and more efficient information discovery schemes is desired. Ideally, a new search operational model operates as follows:

- Users specify to the system their interests in different levels of complexities and possibly in domain specific details.
- Such specifications are then automatically directed to the relevant information locations.
- The retrieved information may optionally be processed by user supplied operations such as comparison, combination or other more complicated decision making methods.
- Finally, the results are sent back to the user for display.

The essence of this ideal model is a concept called "information routing." In short, "information routing" is an extension to the traditional network routing functions with information discovery mechanisms. An "information routing" capable network thus can route not only packets with specific destination addresses, but those that only contain the specifications of their interests.

SUMMARY OF INVENTION

The present invention has been made in view of the above circumstances and has an object to overcome the above problems and limitations of the prior art, and has a further object to provide the capability to search a plurality of interconnected computers and the files stored thereon, and to provide a search response tailored to the search request.

Additional objects and advantages of the present invention will be set forth in part in the description that follows and in part will be obvious from the description, or may be learned by practice of the invention. The objects and advantages of the invention may be realized and attained by means of the instrumentalities and combinations particularly pointed out in the appended claims.

It is a further object of the invention to provide a method of information routing, the method comprising a step of providing a plurality of information provider nodes, wherein each node has a plurality of stored information thereon, and providing a plurality of information requestor nodes. The method further provides a plurality of active network nodes that are connected to a subset of the information provider nodes, a subset of the information requestor nodes and a subset of the active network nodes. The method further includes creating content ontology instance trees and query ontology instance trees on each of the active network nodes. The method includes injecting information content packets that contain content data and content routing data to the stored information located on the information provider node that injected the information content packet. The method further includes modifying content ontology instance trees at active network nodes traversed by information content packets by inserting content data and content routing data contained within the information content packets into a branch of the content ontology instance trees.

Next, the method further includes injecting information query packets containing query data and query routing data to the information requester node that injected the information query packet, and the method includes modifying query ontology instance tree at active network nodes traversed by information query packets by inserting query data and query routing data contained within the information query packets into a branch of the query ontology instance trees. The method also includes establishing an information route between an information requester node and an information provider node, the information route created after an information query packets searches a content ontology instance tree at an active network node, thereby reaching an information provider node, or an information content packets searches a query ontology instance tree at an active network node, thereby reaching an information requestor node.

It is a still a further object of the invention to provide a method of creating an information route in a plurality of active network nodes, wherein each active node containing content ontology instance trees and query ontology instance trees. The method includes receiving an information content packet at the active network nodes, and the information content packet includes residual content data. The method further includes updating the content ontology instance trees at the active network nodes with the residual data from the information content packet, and searching the query ontology instance trees to determine the next hop for the information content packet.

The method further includes receiving an information query packet at the active network nodes, wherein the information query packet includes residual query data, and updating query ontology instance trees at active network nodes with query data from the information query packets. The method includes searching the content ontology instance trees in order to determine the next hop for the information query packet.

The above objects are further achieved by a computer system adapted to creating an information route amongst active network nodes, each active node containing content ontology instance trees and query ontology instance trees. The computer system further includes a processor, a memory including software instructions adapted to enable the computer system to perform certain steps.

Those steps include receiving an information content packet at the active network nodes, and the information content packet includes residual content data. The steps further include updating the content ontology instance trees at the active network nodes with the residual data from the information content packet, and searching the query ontology instance trees to determine the next hop for the information content packet.

The steps further include receiving an information query packet at the active network nodes, wherein the information query packet includes residual query data, and updating query ontology instance trees at active network nodes with query data from the information query packets. The steps include searching the content ontology instance trees in order to determine the next hop for the information query packet.

The above objects are further achieved by a computer program product for enabling a computer to create an information route amongst active network nodes, each active node containing content ontology instance trees and query ontology instance trees. The steps further include software instructions for enabling the computer to perform predetermined operations, and a computer readable medium bearing the software instructions.

The predetermined operations include the receiving an information content packet at the active network nodes, and the information content packet includes residual content data. The operations further include updating the content ontology instance trees at the active network nodes with the residual data from the information content packet, and searching the query ontology instance trees to determine the next hop for the information content packet.

The operations further include receiving an information query packet at the active network nodes, wherein the information query packet includes residual query data, and updating query ontology instance trees at active network nodes with query data from the information query packets. The operations include searching the content ontology instance trees in order to determine the next hop for the information query packet.

It is a still a further object of the invention to provide a network of nodes for information searching. The network includes information provider nodes, each having a plurality of stored information, and information requestor nodes. The network further includes active network nodes, each active network node connected to a subset of the information provider nodes, a subset of the information requestor nodes and a subset of the active network nodes. The network further includes ontology instance trees, each one the active network nodes having content ontology instance trees and query ontology instance trees, wherein each content ontology instance tree contains content data from information content packets and each query ontology instance tree contains query data from information query packets.

The network further includes an active node service package at each one the active network nodes for processing commands embedded within the information query packets and the information content packets.

BRIEF DESCRIPTION OF DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE INVENTION

Figure 1:
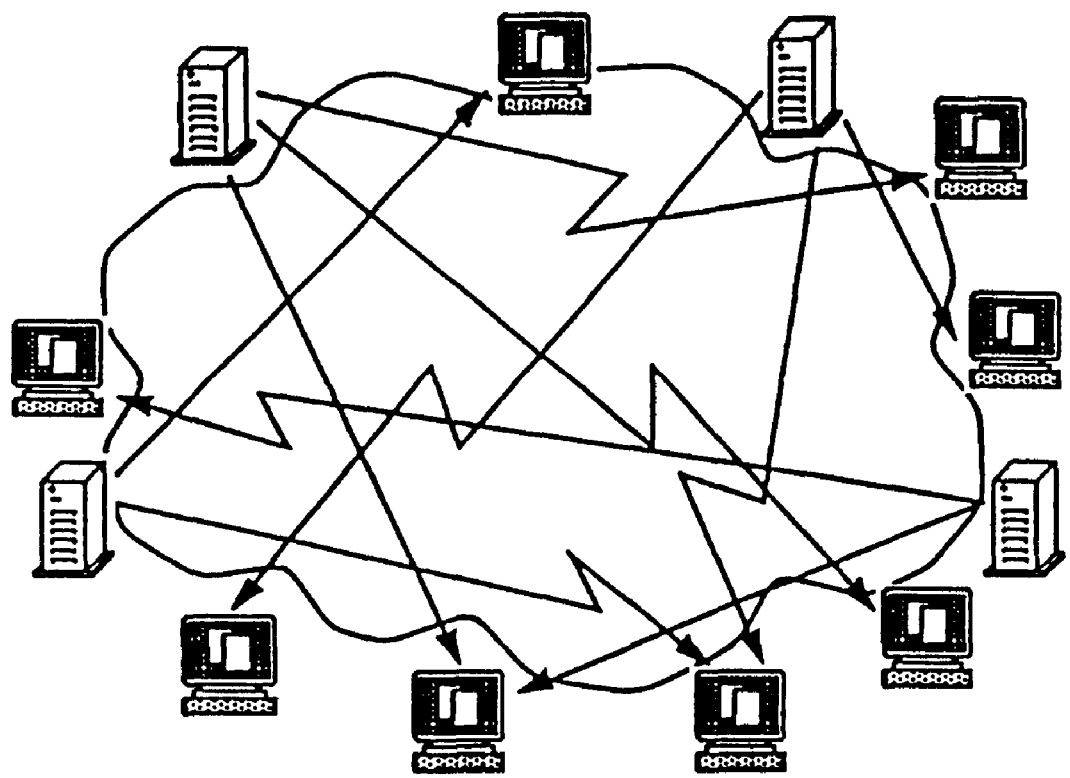
FIG. 1 illustrates the current search operational model with multiple connections to multiple computers.
Figure 2:
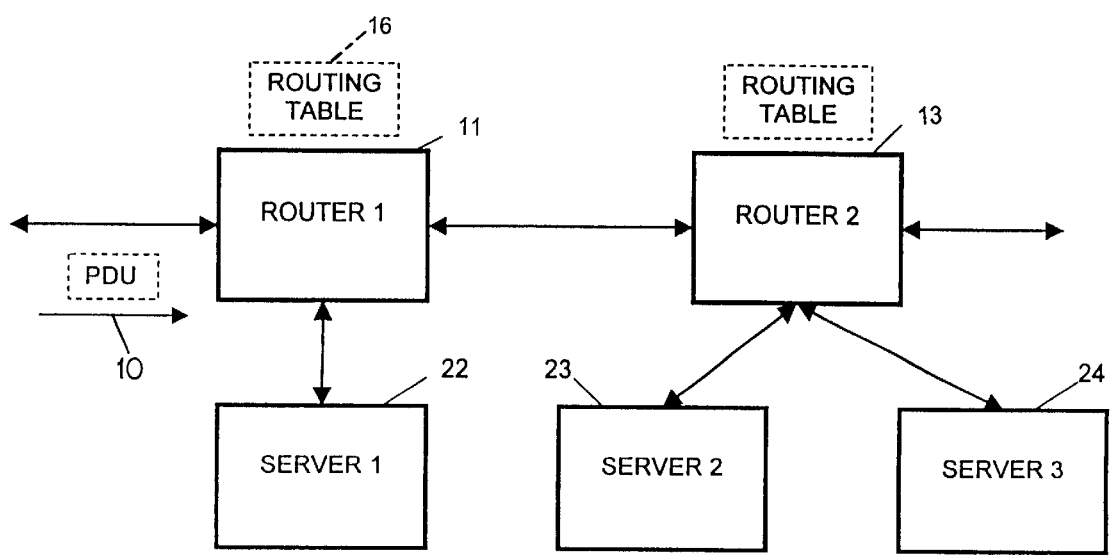
FIG. 2 illustrates the current search operational model with routing tables constructed at each router.

A detailed description of the preferred embodiments of the present invention will now be given referring to the accompanying drawings.

One fundamental difference between information routing and conventional routing such as IP routing is the type and the amount of information required in each routing scheme. Information routing in the present invention has to deal with an extremely large set of data with dynamic and volatile properties. Since the present invention is intended for information discoveries in a networking environment, the network topologies are often arbitrarily complex. Building a table of reachable information at each node is impossible not only in terms of space, but in terms of time: by the time such a table is constructed, the information may already become obsolete.

The present invention uses an ontology-based information hierarchy for semantic structuring and active network architecture for information routing. Both information providers and information requestors participate in the operation of the present invention by injecting their corresponding messages into the system. The information provider may advertise their information in a well-structured way and the information requesters may specify their search criteria and possibly provide their own search programs. The system thus serves as a place for information filtering and binding based on interest specifications and resource limitations. One distinctive feature of the present invention is the symmetrical behaviors of the information providers and information requestors. In other words, both provider and consumer messages are routed based on the traces left in the system by the opposite types of messages.

In the present invention, information routing relies on the active participation of network nodes and a well-organized semantic structure followed by both information providers and requesters. More specifically, active network architecture and an ontology-based information hierarchy are used as the network and the semantic frameworks respectively for the present invention.

An active network will now be described in greater detail. An active network architecture is a network paradigm where its "activeness" is reflected in the enhanced "intelligence" in its network nodes as compared to conventional packet networks. These network nodes are not only responsible for packet forwarding as in the conventional IP case, but may execute programs that are invoked by arriving active packets. These programs are either pre-loaded into the nodes or carried within the packets. This feature gives enormous flexibility in new protocol deployment and application specific interactions with the network. Such flexibility, however, require that security and resource issues be considered carefully in the network design.

Several active network packages have been developed in recent years and have been thoroughly discussed in the literature. Active networks are an approach to getting more flexibility at the IP level through the use of a programmable network infrastructure. Instead of concentrating on the bits in the IP headers, a more general programming language has evolved, thereby allowing network technology to advance more rapidly. Any advancements occur at the program level, not at the programming language level. In general, an active network package consists of a programming language, plus node-resident services. The node resident services may be constructed from general purpose languages. Each packet that transverses the active network does not have an IP header and a payload. Instead, those items have been replaced with a program that utilizes the node resident services. The use of node resident services links together more complex network functions. Most of these packages allow on-the-fly code loading into active nodes and dynamic invocations by active packets.

In the preferred embodiment of the present invention, the Programming Language for Active Networks (hereinafter "PLAN") package developed by the University of Pennsylvania is used due to its overall efficiency and relative completeness. This package consists of a simple, ML-like functional language with remote evaluation primitives and service functions that are deployed and invoked on active nodes.

Bundling a PLAN program into the packet creates an active PLAN packet. It is then injected into the network and evaluated at an active network node. As a result of the evaluation, new active PLAN packets may be created, forwarded, and evaluated at other nodes in the network. An important PLAN primitive is OnRemote(E, H, $R_b$, $R_r$) which are used to evaluate program E on node H with resource bound $R_b$ and routing function $R_r$. This primitive provides a general way to invoke programs on active nodes in the network.

In PLAN, security enforcement is done through trusted code and restricted calling interfaces. Resource consumption of active PLAN packets is mainly controlled by means of hop counts. Upon injection into the network, each active PLAN packet is assigned a count corresponding to the maximum hops that it can travel. The active PLAN packet will be discarded when this count equals zero and it has not reached its intended destination. Further, application-wise resource limit is enforced to control overall network resource consumption.

Another important feature in PLAN is that active nodes may provide "soft stores" where active PLAN packets can temporarily leave "resident data." This provides a means for active PLAN packets to interact with each other, thus facilitating the operation of stateful protocols inside the network. The "soft stores" in the network nodes are essential for building information routing trees in the present invention.

The use of ontology instance trees in the present invention will now be described in greater detail. "Ontology" is used in the context of knowledge sharing to mean "a specification of a conceptualization." In other words, ontology describes the concepts and the relationships that can exist for an agent or a group of agents. An ontology is represented as a set of formal definitions of a vocabulary. Software agents may make ontological commitments such that they agree to use the common vocabulary and communicate with each other in a consistent way. Such communications are in the form of queries and assertions which all conform to the corresponding ontology. Committing to a common ontology ensures that agents interact with one another coherently without sharing a common knowledge base. For agents committing to the same ontology, one agent may know things that the other agents are not aware of, and an agent does not have to know the answers to all queries from other agents. Thus, an ontology commitment guarantees consistency, but not completeness. This makes ontology structures good candidates for knowledge discovery.

The language extensions used to operate on ontology instance trees will now be described in greater detail. Although ontology definitions can take different forms, the most common form adopts hierarchies of classes with each class containing axiom definitions. The Stanford Ontolingua server and the Simple HTML Ontology Extensions (hereinafter "SHOE") to HyperText Markup Language (hereinafter "HTML") proposed by the University of Maryland are two examples of such hierarchical structures. As SHOE is specifically designed for the Web, and the semantic model in the present invention follows the SHOE principle, a brief description of the SHOE extension is appropriate.

When humans read a document, they draw on their knowledge of general language to interpret individual statements. Queries that can easily be answered by a human reader are difficult for query software since the software does not have the benefit of implicit knowledge.

When a SHOE instance makes specific claims based upon a particular ontology, a software agent can draw on that particular ontology to infer knowledge that is not directly stated. The ontology provides context as implicit knowledge. By way of example, assume that there is a relation called "reads" in both the "university-ontology" and the "oratory-ontology." In the former, "reads" is meant as "to read the necessary text for class." In the latter, "reads" is meant as "to read out loud to an audience." Conventional query languages would have to sort through the many meanings of the word, and would have to use the sentence structure in order to accomplish its task. A SHOE instance would not be confused, as it would know the ontology being used, and therefore the context. In addition, SHOE provides a taxonomy that allows categorization and multiple inheritance.

Since HTML was initially designed only for human consumption, it lacks the necessary information structure for automatic knowledge discovery. SHOE adds a small set of tags to HTML that allows documents to be annotated with machine-readable knowledge. More intelligent software agents can then be designed based on these annotations and be used to answer more complicated user queries. There are two types of SHOE tags: those used for constructing ontologies and those used for annotating documents. In analogy to the object oriented terminology, the first type of tags is used to define classes while the other tags are used to instantiate objects from these classes. Thus, new ontologies are defined based on existing ones similar to the inheritance process in class constructions. This evolving process and the ontological hierarchies closely resemble the general knowledge representation and classification structure.

Given its simplicity and expressiveness, ontology hierarchies are also used in the present invention system for semantic structuring and automated information binding. To avoid ambiguity, the words "n-node" and "o-node" shall denote "network node" and "ontology tree node" respectively whenever there is any confusion.

Information routing as performed by the present invention will now be described in greater detail. Information routing refers to the capability of a network (virtual or physical) to route protocol data units based on their specifications of interests. Such specifications may not necessarily contain explicit destination addresses. Two types of information routing can be distinguished. In the first type, packets searching for particular areas of information are routed to the relevant information providers. This is known as query routing. In the second type, packets containing certain information are distributed to their targeted audience, or interested information requesters. This is known as distribution routing.

The present invention supports both query routing and distribution routing which is realized in a cooperative and symmetrical way. This are reflected in the way that the information providers and the information requestors interact with each other. Both parties may choose to inject active packets containing content descriptions or information requests into the active network. Information routing then serves as the bridge to matching entities. For convenience, the entity providing content information shall be referred to as an information provider, and will inject content packets into the active network. The entity injecting content requests into the network in the form of query packets shall be referred to as an information requestor. Thus, query routing in the present invention is responsible for routing query packets based on the content packet interest traces in the system. Similarly, content packets are directed through distribution routing using the interest traces left by the query packets.

Figure 3:
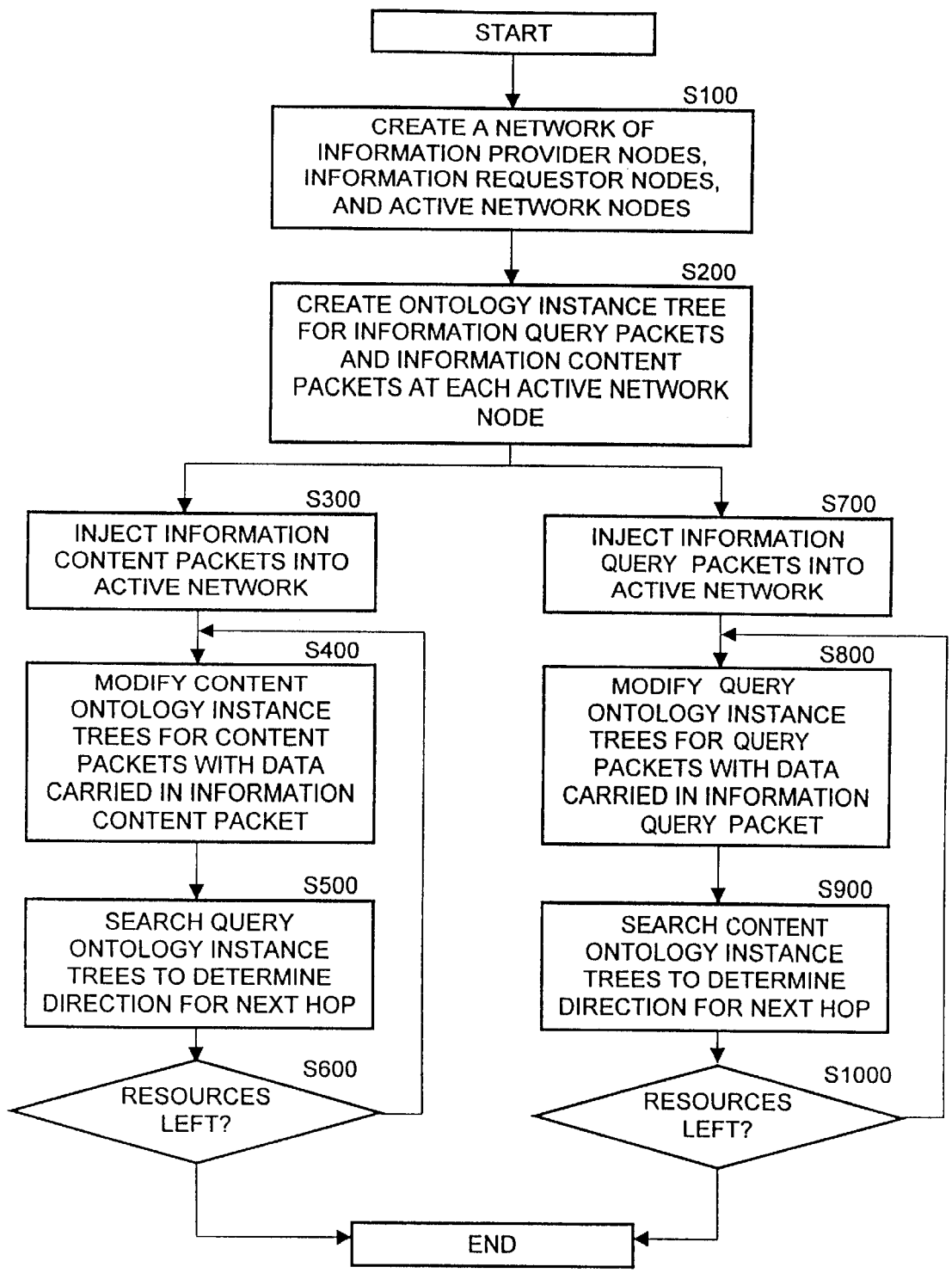
FIG. 3 depicts the process flow for the creation and modification of ontology instance trees, and the dissemination of information query and information content packets.

Referring to FIG. 3, the general operation model of the present invention is illustrated. It should be noted that the information content packets and the information query packets operate simultaneously in the present invention. As shown be Steps S300–S1000, the packets are continually traversing the active network that has been constructed for them. The range of the packets is limited by their resources, which is discussed below.

The content packets and the query packets are not randomly distributed but rather are routed based on a systematic scheme. The active network has a plurality of information provider nodes and information requestor nodes, not all of which are illustrated. These nodes are connected together to form an active network. Each node will have both a content ontology instance tree and a query ontology instance tree for each node that they are connected to in the active network.

Figure 4:
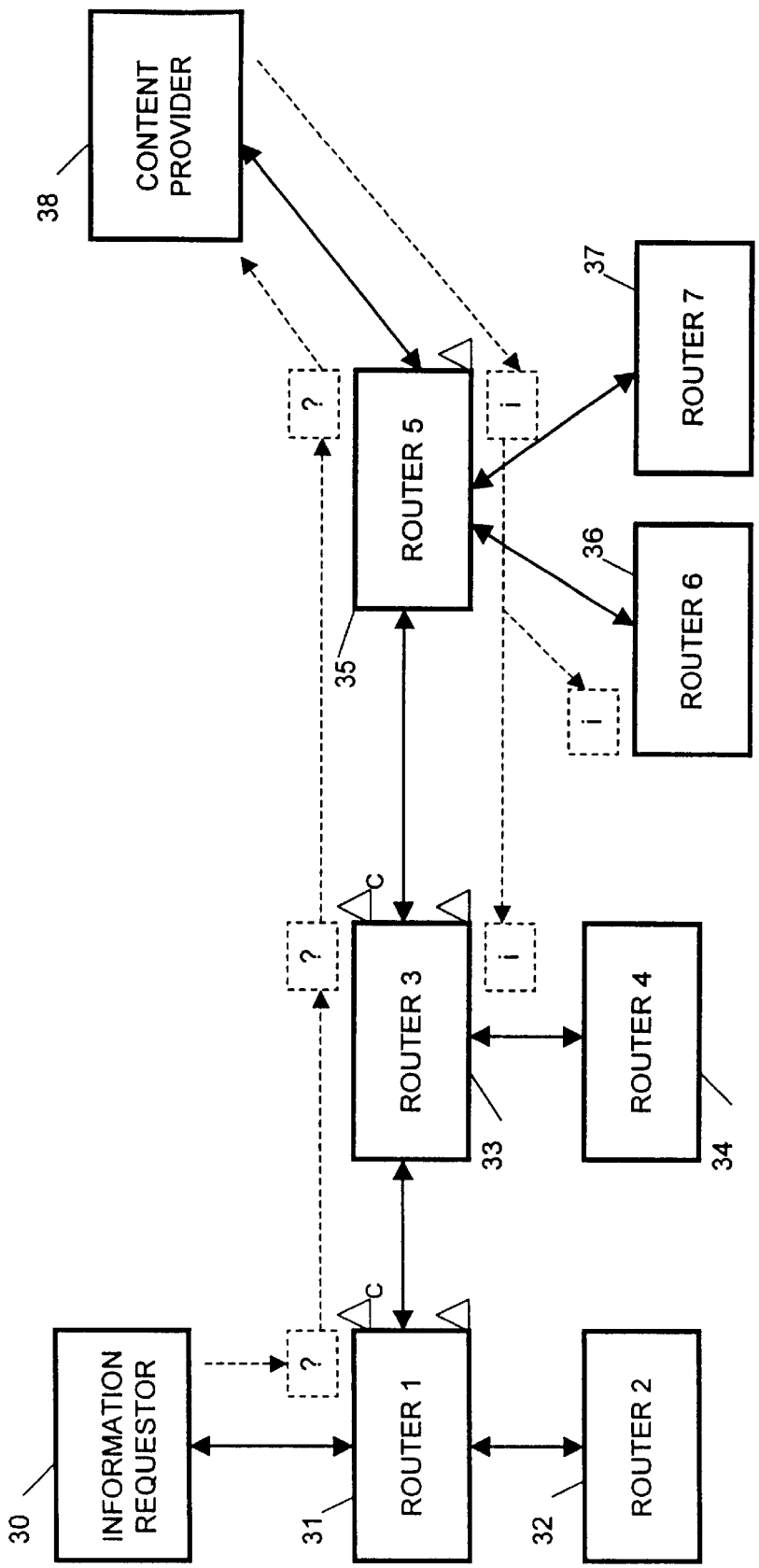
FIG. 4 illustrates the search operational model of the present invention.

Referring to FIG. 4, the information provider node 38 injects a content packet into the network that is received at the router 35. The content packet, after searching the query ontology instance trees ($\Delta_Q$) at the active node at the router 35, determines that it should hop to other routers 33,36 on the active network. The query ontology instance trees at the router 35 contain traces left by information query packets received from the active nodes to which the router 35 is connected. When the information packet reaches the next active network node, it will again search the query ontology instance trees and leave a trace in the appropriate content ontology instance tree.

The information requestor 30 injects an information query packet into the active network, which is received at a router 31. The query packet, after searching the content ontology instance trees ($\Delta_C$) at active node at the router 31, determines that it should to one router 33. The content ontology instance trees at router 31 contain traces left by information content packets received from other actives nodes to which router 31 is connected. At this router 33, the information query packet, after searching the content ontology instance tree, finds the trace left by the information content packet sent out by the information content provider. If the trace left by the information content packet contains material of interest to the information query packet, the information query packet uses this information to establish an information route from the information requestor to the information content provider.

Because of the active nature of the packets and the network nodes, a rich set of information filtering and binding mechanisms are implemented. At one extreme of the mechanisms is the current search operational model wherein the information query packets and information content packets follow direct routes to the corresponding servers and search engines respectively. At the other extreme, every information query packet explores the whole system of the present invention for relevant information while every content packet works like an aggressive direct sales person knocking at each door he can find. Note that portals such as Yahoo!® and Excite® will play a distinctive role in the present invention. On one hand, the portals will need to act as information requesters to attract and filter information content packets as a complementary way in building their index databases. On the other hand, the portals must also feed their index contents into the present invention to increase their visitor bases. The participation of the portals in the present invention may considerably reduce traffic and complement those sites that choose not to inject content packets into the network. Thus, they will serve as an important bridge between the information content providers of the present invention and the information requestors.

The underlying active network architecture brings distinctive benefits into the present invention. First, custom-designed filtering methods (e.g., highest data correlation, avoidance of particular domains, etc.) can be carried in the active packets are registered with the network. This gives users of the present invention considerable flexibility in searching for the right information or targeting the right audience. Second, new binding restrictions are easily loaded into the active nodes. This greatly facilitates the deployment and the evolvement of the present invention.

However, one of the concerns with the present invention is the possibility of network resource abuse by information query or information content packets of the present invention, both in terms of space (traversed links) and time (persistence in the nodes). On the other hand, the effectiveness of the present invention directly relies on the network resource available to each individual packet.

As described above, the essence of the present invention is that the network becomes capable of filtering and directing information flows and eventually completing the binding processes for both information providers and information requesters. It is thus essential that the system embodying the present invention be carefully designed such that these information routing tasks are effectively and efficiently carried out. The present invention accomplishes this through the following processes:

Building a global routing architecture.

Semantic structuring of the packets.

Effectively controlling the system resources consumed by the query and content packets.

Abstracting and storing information from the query and content packets passing through each active node.

Systematically managing such information and making routing decisions based on relevant information found at each node.

The present invention overcomes these problems through the construction of efficient distribution architecture and the processes of information distillation.

Given the arbitrary topology of the underlying network and the limited resources of each packet, it is desirable that the distribution path of any information be loop free while at the same time having extensive node coverage. A non-cyclic path effects an efficient dispersion of the corresponding information by eliminating redundant node visits and simplifying the routing information gathering process. This combination of efficiency and extensiveness requirements closely resembles those found in IP multicasting.

The use of a multicast tree in the present invention will now be described in greater detail. A multicast tree is the routing backbone in the present invention, although the distinctiveness of information routing dictates is that such a tree be used for a different purpose and in a different way as simple multicasting. There are two approaches to building multicast trees in an IP network: source-based and shared tree. The source-based approach constructs a multicast tree for each source. It has the best distribution path for each source but the number of states that has to be maintained by participating routers are prohibitive for large groups.

The shared tree approach builds a single multicast tree for each multicast group and all sources use the same tree for distribution. Although such a tree may not result in the best path for every source, it is much more scalable and is preferred for large, dense multicast groups.

The Core Based Tree (hereinafter "CBT") algorithm is used in the present invention due to its scalability and robustness. The CBT protocol is a network layer multicast protocol for many-to-many communication in a multicast group. A shared tree is built and maintained for each group with the help of a set of concentration points called "cores." Among them, one node is designated as the "primary core" and the rest are referred to as "secondary cores." Network routers are made aware of nearby cores through static configuration or dynamic caching. When a node wants to join a multicast group, it sends a join request towards a nearby secondary core. The node is considered to have joined the tree (and thus notified of its membership) if the request reaches an on-tree node or an off-tree secondary core. In the latter case, the secondary core in turn attempts a join towards the primary core following a similar process.

During the notification process, all the nodes along the way are made members of the tree. Various considerations are taken in the protocol to prevent the formation of loops and to cope with broken connections.

Figure 5:
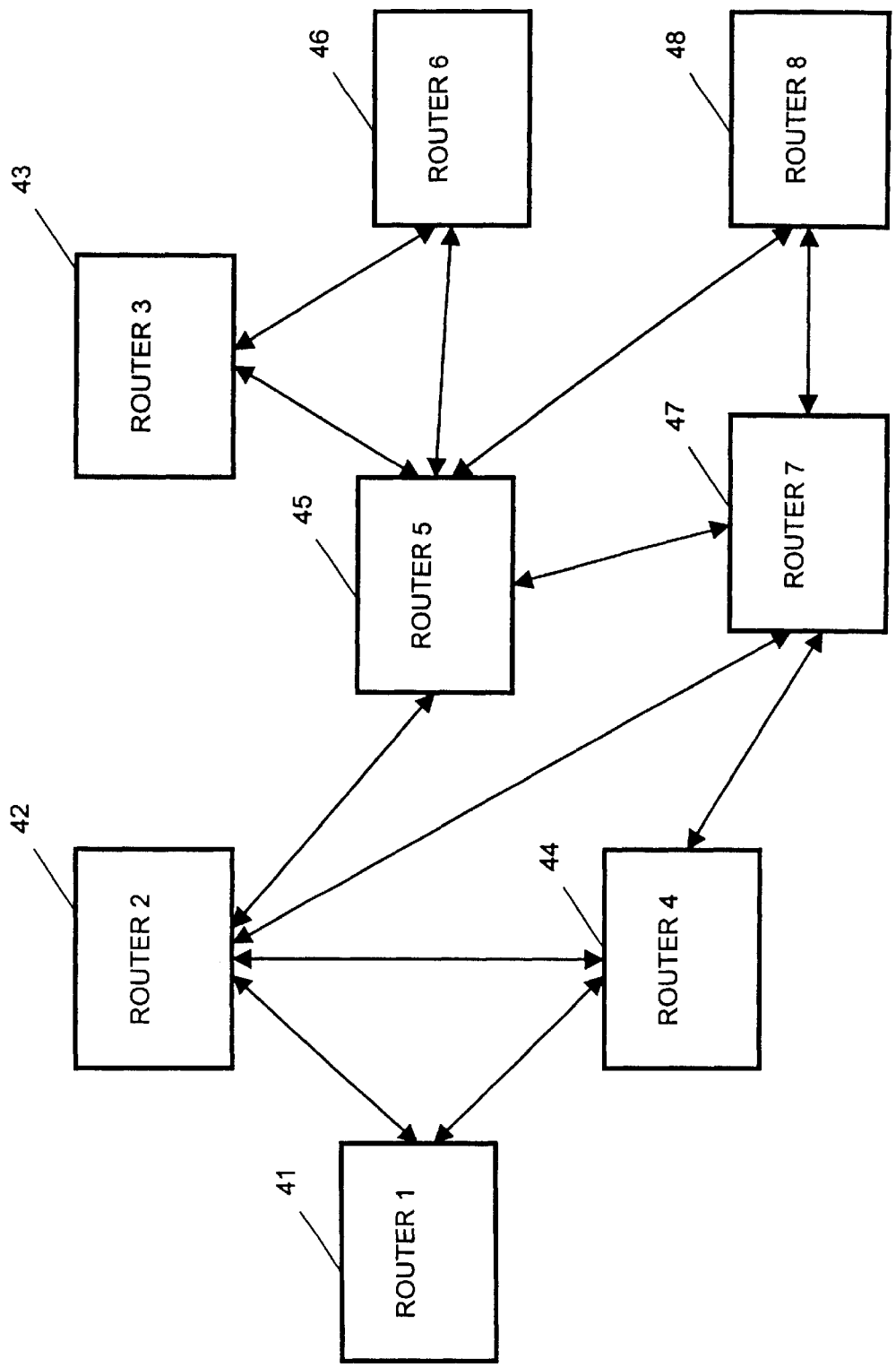
FIG. 5 illustrates the routing connections between several routers, showing the possibility of loops between routers.

Referring to FIG. 5, by way of example, several routers comprise a network. Each of the routers has multiple connections, and therefore several routes between the same two routers exist.

Figure 6:
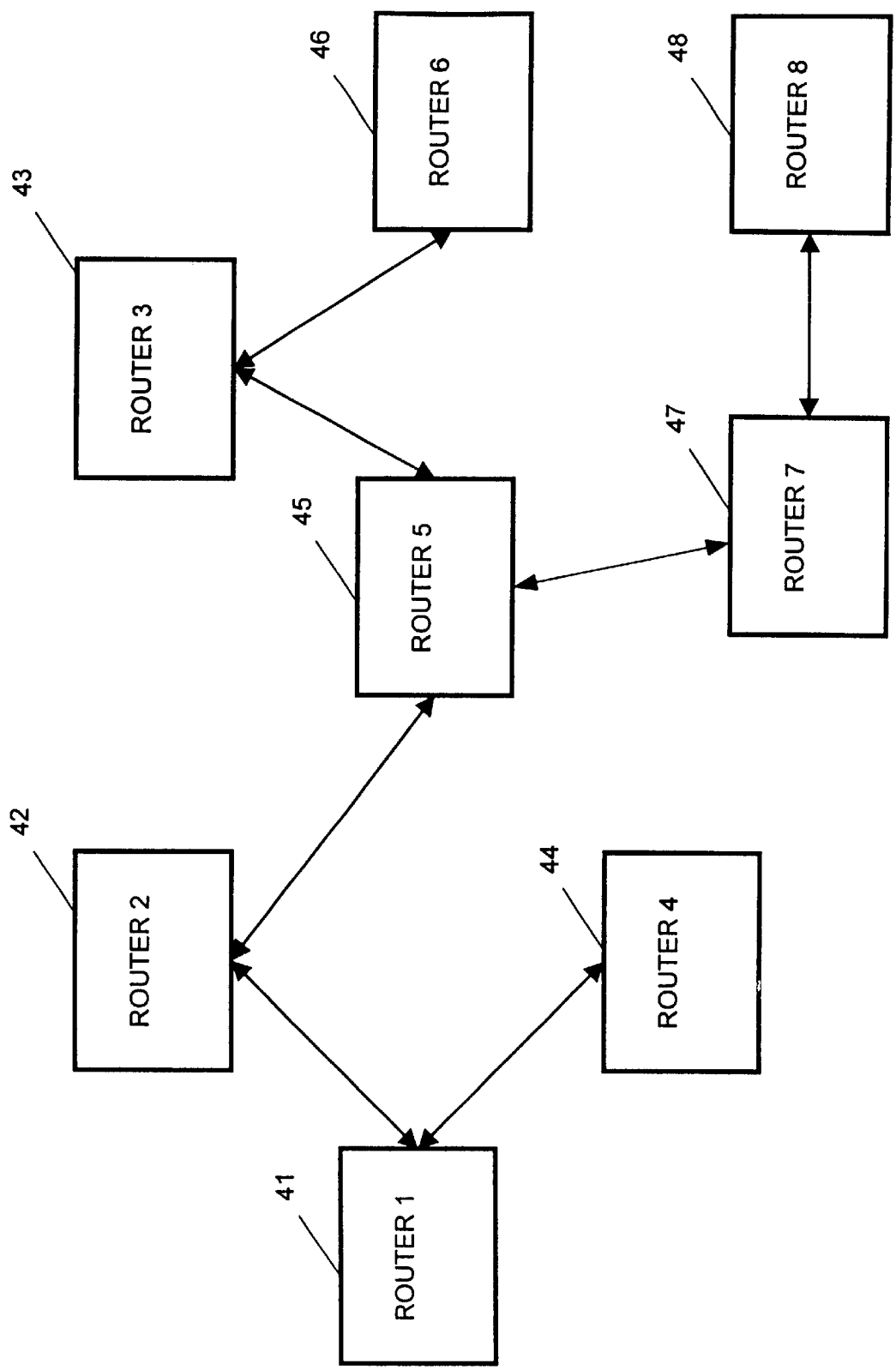
FIG. 6 illustrates a reduced set of routing connections that prevents looping between the routers.

Referring to FIG. 6, the router network after a CBT has been implemented using a Depth First Search (hereinafter "DFS") is illustrated. A single path to each router has been established.

With a shared tree available among all the nodes of the present invention, it is possible to distribute the packets without any redundancy. The present invention incorporates an efficiency enhancement mechanism known as information distillation, which is the process of reducing the amount of data carrying the information without significantly diluting the information itself. In the present invention, this is achieved mainly through packet combination, in which several packets with related information are merged into a single packet. It is made possible through proper semantic structuring of the packets and intelligent routing in the network.

In order to realize automatic processing and routing of packets in the present invention, certain semantic structures need to be imposed on these packets. The formats of the information content and information query packets directly determine the effectiveness of the present invention.

For the present invention, the simple hierarchical format found in the ontology approach is used. Apart from its simplicity, such a structure is also descriptive and flexible. Since new ontologies are derived from existing ones as needed, users can easily extend the existing ontology hierarchies. Domain specific operations are defined and carried inside each packet for refined per ontology processing.

It should be noted that both the information query packets and the information content packets follow the ontology format. Convenient user interfaces are provided to facilitate the construction of both types of packets. By way of example, a request interface may only ask the user to select the category hierarchy of the interests and some search criteria. Similarly, in a content interface, a user only needs to input the ontology path and several keywords. The basic binding process can then proceed by matching the corresponding ontologies and doing a search when necessary. Custom designed filtering methods will also take advantage of this hierarchical structure to expedite the filtering process.

The combining of multiple packets into a single packet will now be described. The ontology structure is also beneficial to packet distribution in the present invention. Since the extent at which a packet of the present invention can explore a network is greatly limited by the resource restrictions on the packet, it is desirable that packets with common interests combine their resources to extend their coverage further. This is the information distillation process described earlier and the hierarchical ontology format makes this process easier and more effective.

By way of example, if several content packets containing information (or location of the information) on "buses," "trains" and "subways" respectively are present at an active node, a new content packet is created which claims knowledge on "public transportation." This new content packet can then be sent to other nodes in place of the three original content packets. An ontology tree instance is built and certain pruning procedures can then be applied to such an instance. To better illustrate this process, a few definitions are necessary.

The Conditional Access Probability (hereinafter "CAP") of an o-node refers to the probability that it is accessed given that its parent node in the tree has been accessed.

For example, if a query is looking for information pertaining to public transportation, the conditional access probability of the bus o-node denotes the probability that this query is interested in bus information.

In general, CAPs in an ontology instance tree are estimated based on the access history information of the tree. For example, over a long period of time, if sixty percent of accesses to the public transportation ontology instance tree are related to buses, the CAP of the bus o-node is approximately 0.6.

The Confidence Level (hereinafter "CL") of a node in an ontology instance tree is the degree of confidence it has about the subject the node corresponds to. More rigorously, the $CL_i$ of node i is defined as follows:

$$CL_i = \begin{cases} 1, & \text{if node } i \text{ is a leaf node} \\ \sum_{j=1}^{l_k} CL_j * CAP, & \text{otherwise} \end{cases} \quad \text{(Equation 1)}$$

where k is the number of children node i has in the instance tree and $I_m$ is the m-th child of node i. Thus, the CL of the nodes in an instance tree is built from bottom up.

The pruning of an ontology instance tree will now be described in greater detail. The CL values of the nodes in an ontology instance can be used in tree pruning decisions. For example, if a node has a high CL, its subtree will be pruned. Such a decision corresponds to the information distillation or packet combination process described earlier. Contrary to the CL calculation process, tree pruning is done from top down. Proper pruning can greatly reduce the network traffic and the storage requirement at each n-node in the present invention.

Figure 7:
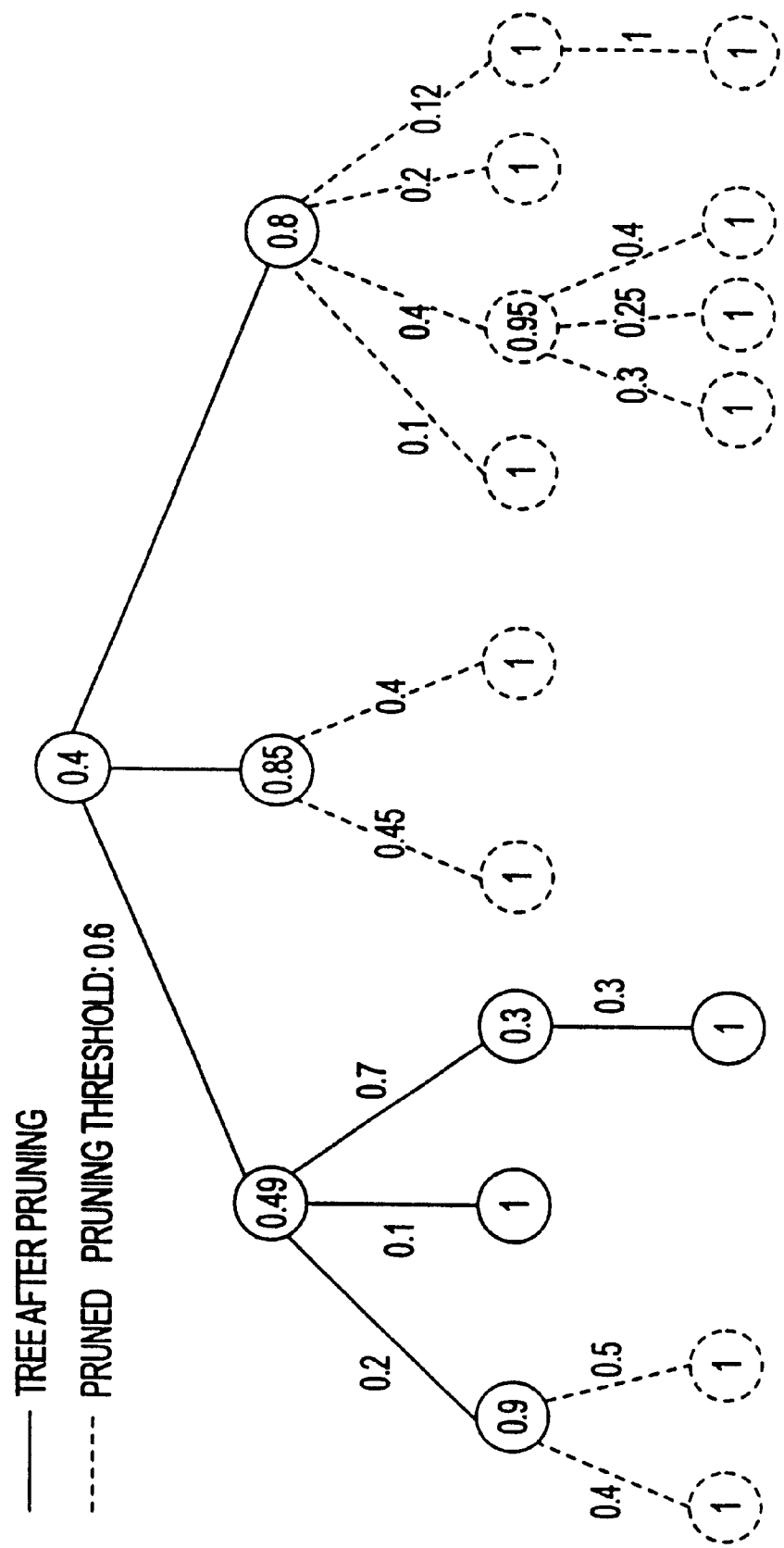
FIG. 7 illustrates an ontology instance tree that has undergone pruning.

Referring to FIG. 7, a pruned ontology instance tree is illustrated. Note that the CAPs of the subtree branches for some o-nodes do not add up to 1. This is because these CAPs are obtained from statistics and some branches of information may have become obsolete. Such branches should still contribute to the CAP statistics but their attached leaf nodes are considered to have CL equal to zero. Thus, their absence from the tree does not affect the correctness of the CL calculation process.

If the CL at the leaf nodes is replaced with the number of pages covering their corresponding topics, the expectations and the variances of the numbers of pages at the internal nodes is calculated in a similar fashion. Such information can also be provided at the ontology instance trees and used by the packets of the present invention to make routing decisions in a quantitative way. In particular, the information can help the packets determine the estimated number and the distribution skewness of the relevant documents encountered along certain directions.

The modification of ontology instance trees at an active node and forwarding the modified ontology instance tree to neighboring active nodes will now be described in greater detail. The concept of pruning ontology instance trees stored at a particular active network node is an optimization that is used when the ontology instance tree is exchanged with a neighboring active network node. When a content packet is received at a particular active network node, the content packet interacts with the ontology instance tree associated with the port over which the content packet arrived. The content packet will interact with the ontology instance tree in several ways. First, the content packet may be changed to reflect the current state of the ontology instance tree that it is interacting with and other ontology instance tree, and then it is forwarded to all the other neighboring nodes on the routing tree. Second, the content packet updates the associated ontology instance tree, and then ceases its travel. The active network node itself takes on the responsibility of forwarding the updated ontology instance tree, or a portion thereof, to all its neighboring active network nodes in order to refresh the ontology instance trees at those nodes. Third, a combination of ontology instance tree update, content packet forwarding and ontology instance tree forwarding is also possible.

The resource controls and bounds on information query packets and information provider packets will now be described in greater detail. As described above, the activities of individual packets of the present invention must be regulated to ensure the secure and efficient operation of the system. Such regulations need to cover two aspects of system controls: What a packet is allowed to do in the network (access control) and how much network resources it can consume (resource control). For access control, the present invention relies on the mechanisms provided by the PLAN package to restrict the effect of each packet on the state of the active nodes in the network. In general, a packet of the present invention can invoke two types of functions: Those embedded in the PLAN language and those extended in the service packages of the present invention. Since the latter are built upon the basic PLAN functions, the functional impact of the packets is effectively limited.

Resource control is another important aspect of the present invention. Given the active nature of the present invention, it is crucial that system resources such as node storage space and link bandwidths be judiciously engineered and fairly controlled. The hop count-based resource control employed in PLAN and most other active network packages becomes inadequate as it lacks several important features that are required in the present invention. These include:

Resource combination;

Resource refueling; and

Network node resource control;

To implement these features, the PLAN package is enhanced with additional resource control mechanisms. One key to these new mechanisms is a concept called "resource donation." Resource donation is a mechanism in which an active packet transfers part or all of its resource bound to another active packet. The term also refers to the amount transferred when there is no danger of confusion.

A resource donation decision is made either through certain flags in the donating packet, or through the execution of the program invoked by the packet. Resource donation opens many new possibilities for a more active operation of the present invention.

By way of example, certain packets can merge into one packet to extend their distribution or search ranges. Specialized software agents may exchange resources for data insertions into packets. Portal sites can attract packets towards their sites by providing them with necessary resources.

For per node resource control, an Active Node Time Limit (hereinafter "ANTL") field is added to each packet of the present invention. The field is used to control the lifetime of the resident data left on a node by the corresponding packet. Upon arriving at a node, if a query packet or content packet decides to leave data resident at the node and it is allowed to do so (by access control), an expiration time is tagged on to the data. Resident data on each node will be checked periodically and those with expired time limit are cleared out of the node.

It should be pointed out that both the resource bound and the ANTL fields of a packet are assigned values by the interface of the present invention at the time when the packet enters the system. In another word, these values are part of the protocol of the present invention and cannot be arbitrarily determined by individual packets or applications. In order to more securely control these value assignments, a credit based resource management scheme is added into the present invention. Credits are granted by or "purchased" from trusted parties located throughout the system. For example, the operational model in the present invention is as follows:

Each query packet or content packet is assigned certain amount of free credit upon injection into the system based on the ontology popularity distribution.

A query packet or content packet may decide to acquire additional credits through purchase or credit transfer so that it can out-stretch its covering area.

Portal sites and software agents can purchase credits and use them for credit transfers to attract query packet or content packets or place data in these packets.

In the present invention, various query packets and content packets are injected into the system, and then follow the distribution tree to reach the relevant n-nodes. Once in the network, each query or content packet traverses through the network as far as possible, installing filters carried within the packet and binding with matching filters at each active node it traverses. Once a filter is installed at an active node, it is associated with an expiration time that is the sum of the current time and the ANTL carried with the filter. Each active node periodically cleans those filters whose time expired. Since this time is a per node resource limit, packet originators can "purchase" more times for their packets through different means.

Unlike simple multicasting, the information routing process in the present invention involves system specific decision making at the active nodes and customized selection processes invoked by individual packets. To better explain the functioning details of the present invention, the structure and the operation of a single node will be described (i.e., illustrate through examples the information tree construction process and a single query routing process at a single node).

Figure 8:
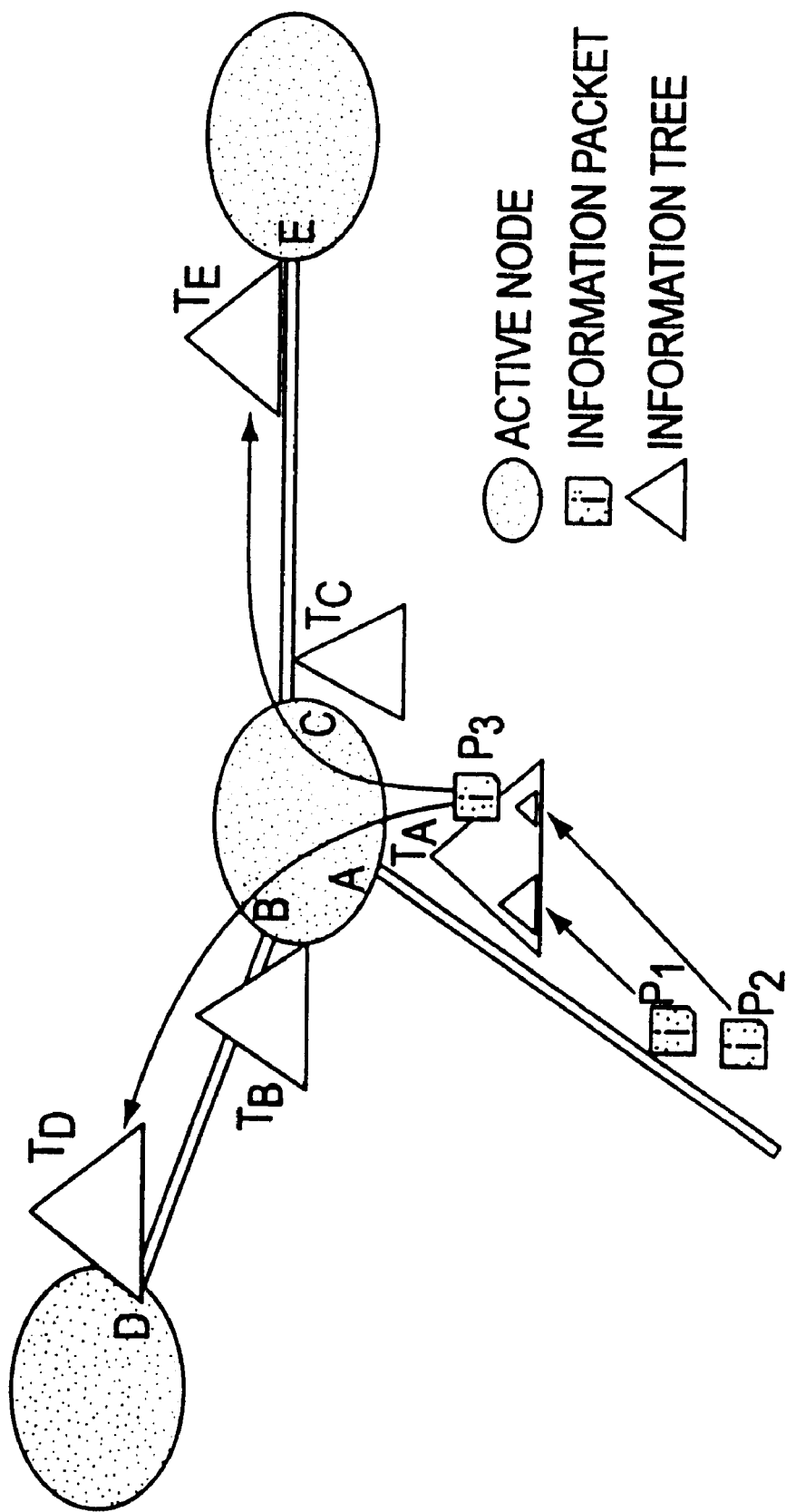
FIG. 8 illustrates a typical node of the present invention with links to other nodes and their accompanying ontology instance trees.

The modification and forwarding of content and query ontology instance trees will new be described in greater detail. Once a distribution tree is determined, each node has a number of interfaces connecting to their tree neighbors. Referring to FIG. 8, an n-node with three attached links A, B, C is is illustrated. Associated with each link A, B, C is an ontology based information tree that is constructed from information content packets arriving from that link and represents the information reachable through the link and beyond. As illustrated in FIG. 8, when a information content packet arrives at interface A, it is first inserted into the corresponding information tree $T_A$. Depending on its impact on the tree structure, it is either absorbed by the tree (i.e., when it does not significantly change the knowledge the tree is representing, as illustrated by $P_1$) or sent out through the other interfaces to be further processed by other nodes (i.e. when it substantially updated part of the tree, as illustrated by $P_2$ and $P_3$). Similar processes happening at link B and link C are not depicted in the figure for readability.

Figure 9:
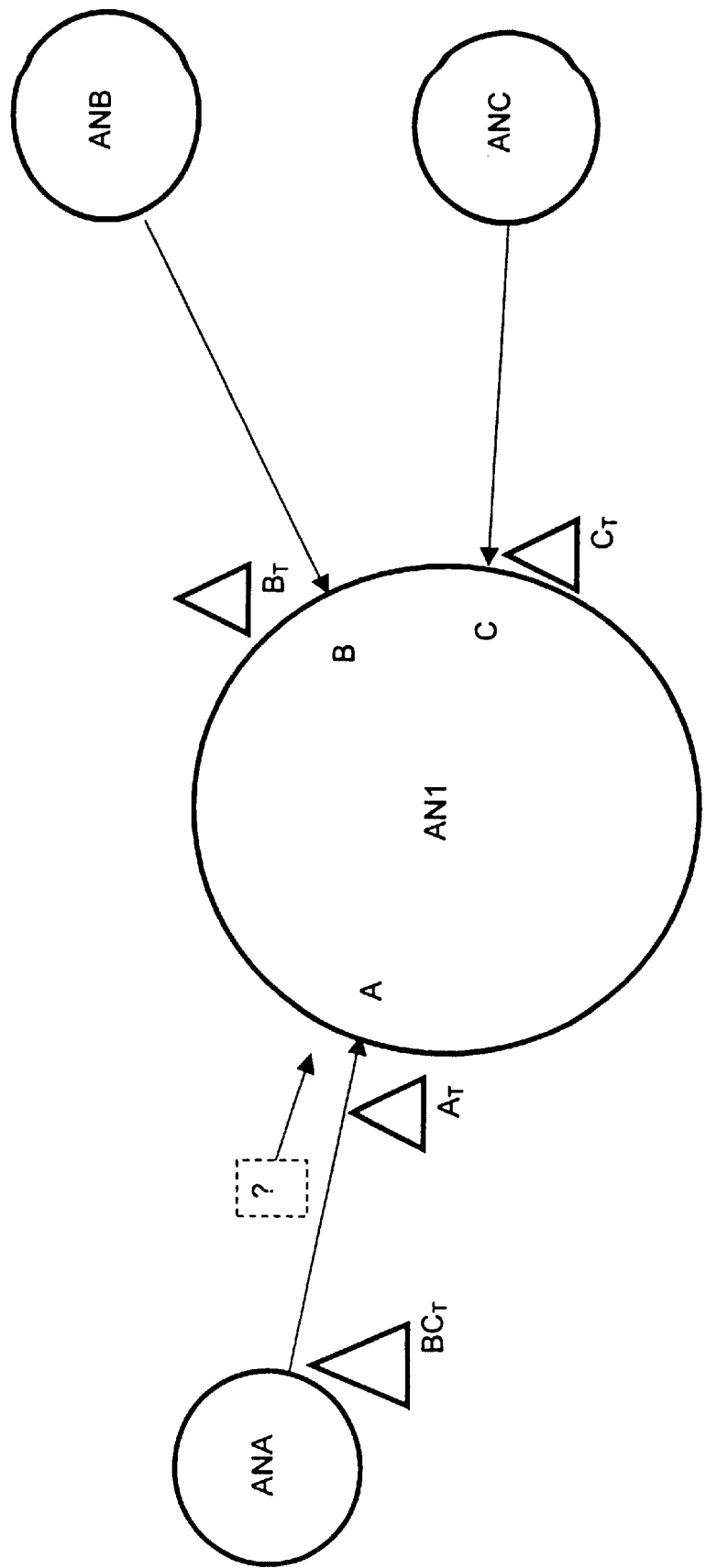
FIG. 9 illustrates query routing according to the present invention at a node.
Figure 10:
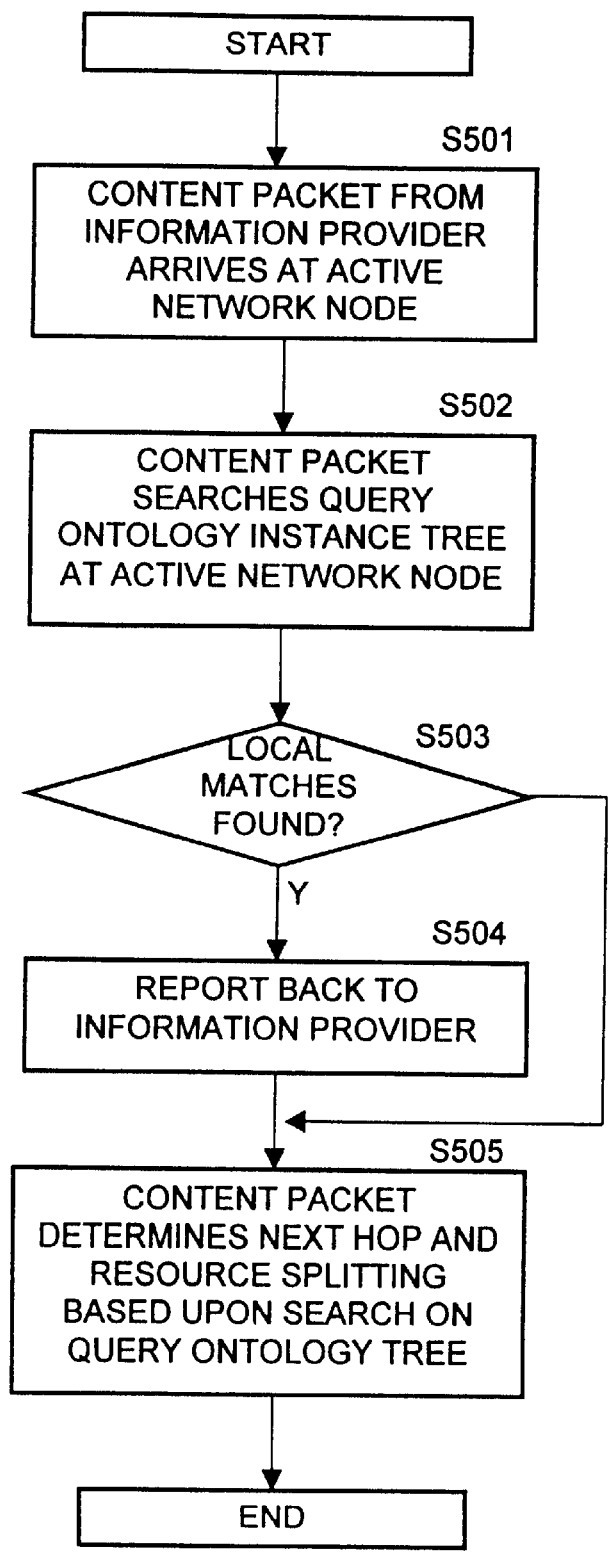
FIG. 10 illustrates the process flow for searching of query ontology instance trees by information content packets at an active node.
Figure 11:
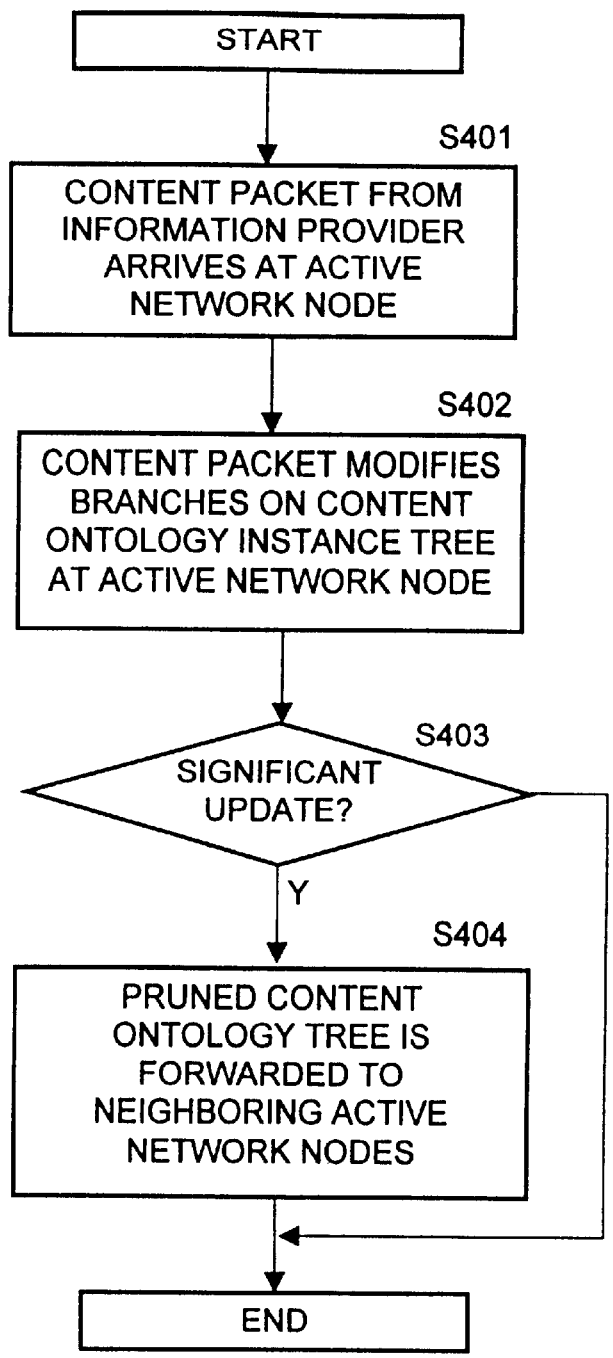
FIG. 11 illustrates the process flow for modification of content ontology instance trees by information content packets at an active node.
Figure 12:
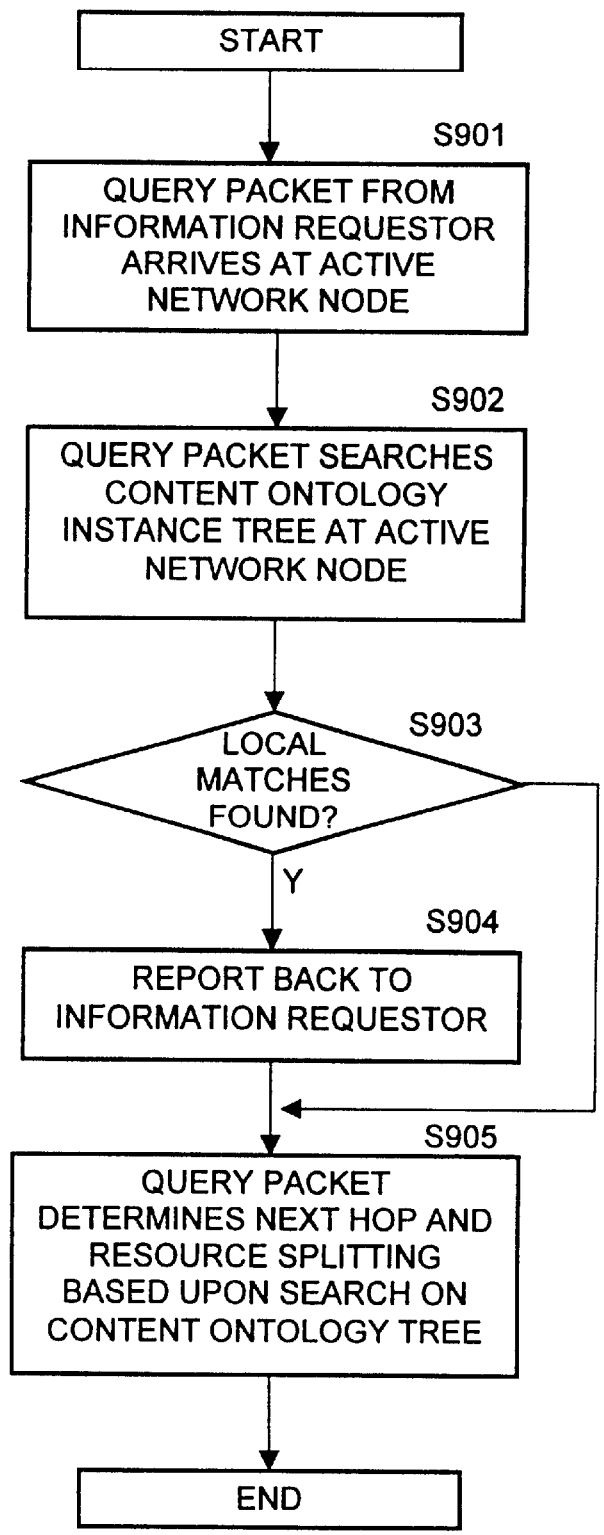
FIG. 12 illustrates the process flow for searching of content ontology instance trees by information query packets at an active node.
Figure 13:
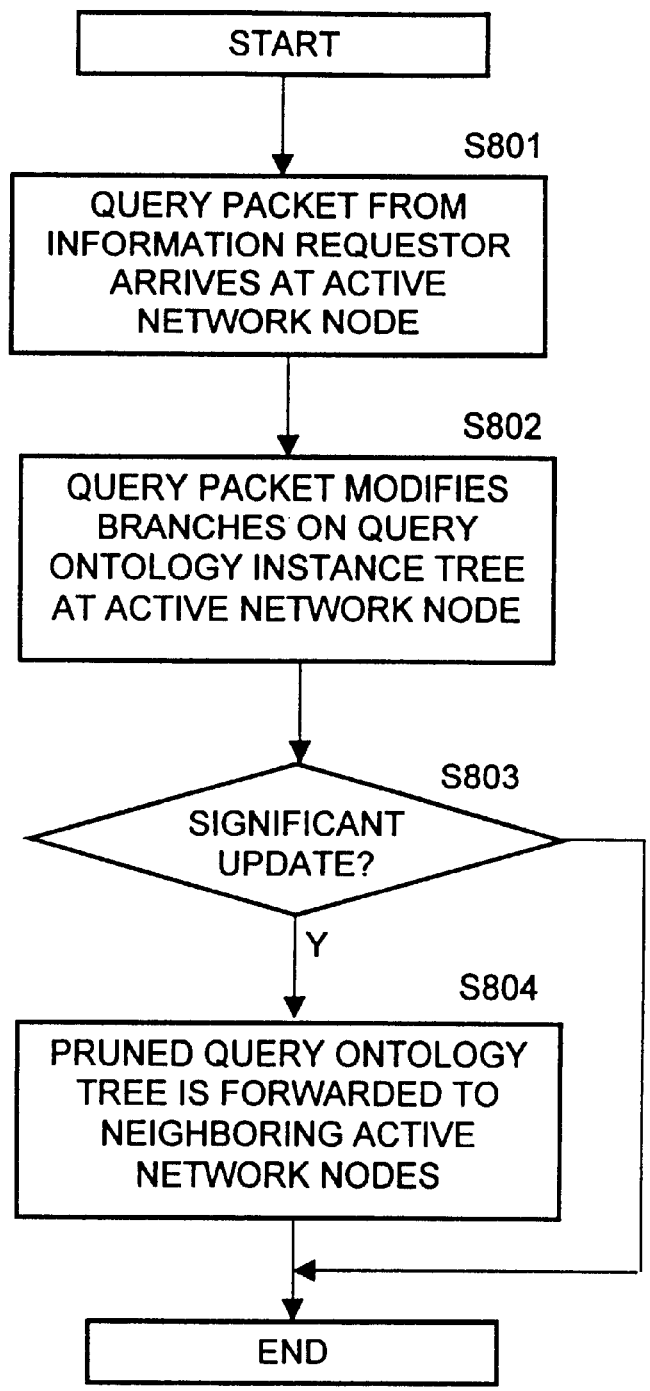
FIG. 13 illustrates the process flow for modification of query ontology instance trees by information query packets at an active node.

Referring to FIG. 9, the ontology instance tree $BC_T$ that is associated with active node $AN_A$ summarizes all the knowledge towards active node $AN_1$, which is the union of the content that is stored in the ontology instance tree of $B_T$ and $C_T$ on active node $AN_1$. Assume that a content packet arrives at link A on active node $AN_1$. This information packet changes the state of the ontology instance tree $AN_1$ which summarizes all information seemed by active node $AN_1$ looking out from the link A. If the content packet changes the state considerably, the ontology instance trees at active node $AN_B$ may also require updating. However, the content packet that is sent to active node $AN_B$ needs to consider the information in the ontology instance tree corresponding to link C.

In addition, if a content packet also wants to route to the requestor nodes that which have requested particular information, it needs to look at the ontology instance tree created by the query packet type. Content packets is look at ontology instance trees created by query packets, and query packets look at ontology instance trees created by content packets. By way of example, consider a content packet injected into the network for the first time. When the content packet arrives to the first node, the content packet interacts with the ontology instance tree for its own packet type at the port. The content packet only plays this role for the first active node that it reaches. The change to the ontology instance tree may create a packet of this type, which is forwarded to its active node neighbors, or the node creates ontology instance tree for a specific link, i.e., the union of ontology instance trees for the other links on the active node. The active node then forwards the newly created ontology instance tree to its active node neighbors periodically. The content packet then looks at the ontology instance trees of query packet types on all the links except for the link that it arrived on. The content packet then decides if it should move on to the next active node. The mechanism for doing this is the described earlier. If the content packet decides to move to another active node, it will not repeat the activity of creating a new ontology instance tree.

Referring to FIG. 8, information routing in the present invention system is a hop-by-hop routing scheme. Another parameter in each ontology node is called Average Distance (hereinafter "AD") and is used to indicate how much resource needs to be spent in order to get to the origin of the related information. It is calculated in a similar way as the CL parameter. The AD of any leaf o-node is equal to the actual hop counts from the origin of the information to the current n-node. This is obtained through hop increments. The average distance $AD_i$ of an internal o-node i is defined as:

$$AD_i = \sum_{j=l_1}^{l_k} AD_j * CAP_j \Big/ \sum_{j=l_1}^{l_k} CAP_j \quad \text{(Equation 2)}$$

where k is the number of children node i has in the instance tree and $I_m$ is the m-th child of node i. From the above formula, that unlike CLs, ADs do not consider obsolete branches in their calculations. This is justified as the AD of an o-node is used to indicate the average distance between the current n-node and the sources of all the "available" information branching from the o-node. While a CL reflects how confident an o-node is about the information on "all" its subcategories.

Referring to FIG. 9, query processing at a node will be described in greater detail. When a query packet arrives at interface A, the trees $B_T$ and $C_T$ at interfaces B and C respectively are checked to make the routing decision for the packet. For simplicity, these two trees are consolidated into a single tree $BC_T$ in FIG. 9. The packet follows the ontology structure in the tree $BC_T$ until it finds all matches that represent possible directions for its interested contents. At this point, a decision must be made as to which directions to go and how much resource in the original packet to split into each direction. Such a decision will be based on the CL and the AD of each match. The packet can make this decision according to the custom designed program carried in the active packet. In addition, the active node is configured to provide default decision functions. This gives individual users of the present invention tremendous flexibility in adjusting their searching and distribution strategies to best suit their needs.

In the present invention, when a combined packet generates a match at a later point, the result is forwarded to the node where the packet was originally generated. More refined filters are introduced and more specific results are directed to their corresponding information requesters.

It should be pointed out that almost identical processes are used to build query trees and perform information routing (i.e., query packets and content packets are treated in completely symmetrical ways). The concept of leaving traces in the network for query packets is quite powerful as it allows a wide spectrum of desired user activities. By way of example, by controlling the duration a query packet can persist in the network, a user can easily specify whether he is interested in only history information, completely new information or information within a certain period in the near future.

Conceptually, each interface at an n-node maintains a separate o-tree that is built from packets arriving at all the other interfaces at the n-node. The main reason for such a conceptual distinction is for more efficient information discoveries and distributions: each packet only needs to match against the ontology instance tree at its arriving interface without concerning about redundant matching results. Ontology instance trees are distilled and sent out from their interfaces with the assurance that no redundant information will be sent to any n-nodes. It is clear that these trees are bundled together into one tree for space efficiency in actual implementations.

Note that the single tree at each interface is further divided into two trees logically: a content tree built from information content packets and a query tree consisting of information query packets. Since both trees use the same ontology structure, they are combined for efficient management. This requires that certain flags be set in the tree to distinguish between these two different types of information.

The present invention resides in a computer system. Hence, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

The above-identified invention may be embodied in a computer program product, as will now be explained.

On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media," or "computer-readable media," as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the above-identified invention.

Thus, the present invention is also embodied in a program product bearing software that enables a computer to perform information routing according to the invention.

In creating an embodiment of the present invention, the active network system must include the following:

Infrastructure configuration.

Service packages at each node for ontology instance tree buildup and maintenance.

Routing tree construction.

Request and information generation and injection.

A graphical interface for monitoring.

The components of the present invention are loaded into each participating active node as PLAN service packages. A network generation program is used to produce and initialize an active network configuration. Users are allowed to provide multiple parameters specifying the distributions of the number of links on each node and the connectivities among the nodes. The result of this configuration program is then fed into the PLAN network set-up module to actually start each node and setting up node connections.

It should be noted that the present invention does not require that every node in a network be a node configured for the present invention. In another embodiment, the present invention is configured as an overlay network on an actual network system. Only participating nodes need to join the present invention's overlay and assume the functionality of the present invention. Joining and quitting procedures similar to those in the IP multicasting tree protocols are used to manage such an overlay network.

Once the network backbone of the present invention is set up, the core of the present invention is loaded into each node as PLAN service packages. PLAN provides two different types of loading methods. In the first method, service functions in the form of library code are read into each node from designated files. In the second method, packages are dynamically linked into is a node through code transmissions.

As described above, the purpose of PLAN packages are to provide services to individual active PLAN packets. The PLAN packages make the active packets much more succinct and improve payload efficiency since active packets need just carry pointers to the commonly used service functions instead of the functions themselves. The service packages of the present invention function in the same role. For one embodiment, a set of core functions was implemented that manages information filtering, binding, storing and forwarding.

addTreeNeighbor(ifc): Make the network node connected through the interface ifc a neighbor in the distribution tree, effectively adding one end of a tree edge.

removeTreeNeighbor(ifc): Opposite to the above operation.

insert(pkt): Insert a packet into the ontology instance tree at the node. Proper tagging is done to indicate the type and source of the packet.

search(pkt): Search the items in the ontology instance tree which matches the search packet. Uses such information as packet type, search term ontology hierarchy and keywords during the search.

distribute(pkt, ifc_list): Based on searching result, further disperse the packet to other nodes in ifc_list which may possibly lead to matches.

update_cl( ): Update the CLs in the nodes of the ontology instance tree and propagate the results to neighboring nodes.

process_packet( ): A general interface provided to the outside for invoking the services of the present invention at configured nodes.

Routing tree constructions is carried out in a similar way as those found in the proposed IP multicasting areas. In the algorithm, a node is chosen as the logical root of the tree either through user selection or by the simulation core. An active packet is then sent to the node instructing it to start constructing a routing tree. A DFS procedure is then initiated by the root to inform subsequent nodes for tree generation. In this procedure, each node to be traversed receives an active packet containing the tree construction code as well as certain state information such as the address of its parent node. Once a node is identified as a candidate node, it marks itself and record the corresponding tree interfaces. This way, no loops will be formed. When the construction procedure is completed, each participating node has a list of interfaces that indicate all its tree neighbors.

The operational model of the underlying PLAN system determines that each packet invoke a service function in order for it to be properly handled at its destination node. The process_packet function is designed specifically for this purpose. When a packet is constructed, relevant information regarding the purpose of the packet is registered in certain default fields in the packet. One of these fields represents the function to be invoked and it contains a reference to process_packet. Upon the packet's arrival at an node, the installed service function will be called and it in turn invokes other necessary functions such as insert(pkt) and distribute(pkt, ifc_list).

In a system, the graphical interface generally serves the purpose of user convenience and visual stimulation. The interface component consists of a user front end and a communication core. The latter is responsible for interacting with the active nodes in the present invention. User inputs are properly encoded and transmitted to their destination nodes through this core. In the opposite direction, the core periodically collects status information from each node and presents them to the front end for display. Through this interface, users can control and observe the network topology, the routing structure and various ontology instance trees in the present invention.

One embodiment of the present invention is deployed on local area networks or configured as an overlay networks on top of a much larger network topology. The system can then easily grow through hierarchical connections or coverage expansions.

From the perspective of the functional domains, a wide spectrum of embodiments, ranging from the whole information hierarchy to more specific areas such as E-commerce, technical information and sports news are implemented with the present invention. These two aspects are orthogonal to each other and are combined in an arbitrary way.

The present invention relies on the underlying active network for information filtering and routing. The active nature of the network nodes and packets of the present invention make it possible to efficiently utilize network resources and effectively shorten the information discovery path. However, given the flexibility of the present invention, it is not mandatory that every node in the underlying network be an active node. An embodiment of the present invention is easily adapted to operate on an overlay active network. The routing tree construction process in the present invention can select only those nodes that are willing to participate as the overlay nodes. Virtual links are maintained between those nodes without direct physical connections.

Another embodiment of the present invention is implemented on a conventional non-active network without any modification to the network switches or routers. In this embodiment, an application level "overlay network" is built using network edge nodes—computers connected to the network due to the ubiquity of the Internet and power of the agent technology (e.g., Java). Under this embodiment, a more responsive and more tractable Internet is constructed in which information providers and requestors actively interact with each other and get more instantaneous and more relevant responses. Any users of the Internet can have the freedom to "push" their information or requests into the Web and get interested results without the necessity of setting up their own Internet servers.

A further embodiment of the present invention allows it to be implemented as an application level overlay system in a small scale networks, such as the corporate network (Intranet) information systems. Again, content providers within the corporate network are easily matched with queries from users.

A further embodiment of the present invention pertains to the application domains. Since the present invention employs an ontology-based semantic structure, the search operational model is applied on any part of sub-hierarchy of the ontology instance tree, thus resulting in applications in specific knowledge domains based upon the present invention. By way of example, the "commerce" branch of an ontology instance tree is explored and an E-commerce application built, based on the present invention. The active nature of the packets gives them much freedom in distributing, comparing and even purchasing items.

A further embodiment of the present invention is an application built for distributing and finding technical papers and publications. The search parameters are designed to be very broad or very narrow, and also instructed to wait for new publications.

It should be noted that multiple applications do co-exist in the same physical network or overlay network. The participating network nodes are configured to support different applications and possibly manage the application data together. As the needs for domain or coverage growth arise, applications may choose to merge at participating nodes.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein. It is intended that the scope of the invention be defined by the claims appended hereto, and their equivalents.

What is claimed is:

1. A method of information routing, comprising:

providing a plurality of information provider nodes, each having a plurality of stored information thereon;

providing a plurality of information requestor nodes;

providing a plurality of active network nodes and connecting each active network node to a subset of said plurality of information provider nodes, a subset of said plurality of information requester nodes and a subset of said plurality of said active network nodes;

creating at least one content ontology instance tree and at least one query ontology instance tree on each of said plurality of active network nodes;

injecting information content packets, each of said information content packets containing content data and content routing data to said plurality of stored information located on the information provider node that injected said information content packet;

modifying said at least one content ontology instance tree at active network nodes traversed by said information content packets by inserting content data and content routing data contained within said information content packets in a branch of said at least one content ontology instance tree;

injecting information query packets, each of said information query packets containing query data and query routing data to the information requester node that injected said information query packet;

modifying said at least one query ontology instance tree at active network nodes traversed by said information query packets by inserting query data and query routing data contained within said information query packets into a branch of said at least one query ontology instance tree; and establishing an information route between at least one information requester node and at least one information provider node, said information route created after said information query packets search said at least one content ontology instance tree at each active network node traversed, thereby reaching an information provider node, or said information content packets search said at least one query ontology instance tree at each active network node traversed, thereby reaching an information requester node.

2. The method as set forth in claim 1, wherein connecting each active network node includes building a routing tree for said plurality of active network nodes.

3. The method as set forth in claim 2, wherein building a routing tree includes performing a depth first search to prevent the formation of loops between the individual nodes of said plurality of active network nodes.

4. The method as set forth in claim 1, wherein modifying content ontology instance trees includes assigning confidence levels to nodes within said content ontology instance trees based upon said content data inserted by said information content packets.

5. The method as set forth in claim 4, wherein modifying content ontology instance trees includes pruning of said branches of said content ontology instance trees based upon the confidence level of said nodes.

6. The method as set forth in claim 1, wherein modifying query ontology instance trees includes assigning confidence levels to nodes within said query ontology instance trees based upon said query data inserted by said information query packets.

7. The method as set forth in claim 4, wherein modifying query ontology instance trees includes pruning of said branches of said query ontology instance trees based upon the confidence level of said nodes.

8. The method as set forth in claim 1, wherein injecting the information query packet includes:
adding search filters to said information query packet;
adding a search interest hierarchy to said information query packet; and
adding function invocations to said information query packet that are recognized by said plurality of active network nodes.

9. The method as set forth in claim 1, wherein injecting the information content packet includes:
adding search filters to said information content packet;
adding a search interest hierarchy to said information content packet; and
adding function invocations to said information content packet that are recognized by said plurality of active network nodes.

10. The method as set forth in claim 1, wherein injecting said information query packet includes assigning a predetermined amount of resource credit to said information query packet.

11. The method as set forth in claim 1, wherein injecting said information content packet includes assigning a predetermined amount of resource credit to said information content packet.

12. A method of creating an information route in a plurality of active network nodes, each active node containing at least one content ontology instance tree and at least one query ontology instance tree, comprising:
receiving an information content packet at one of said plurality of active network nodes, said information content packet including residual content data;
updating said at least one content ontology instance tree at one of said active network nodes with said residual data from said information content packet;
searching said at least one query ontology instance tree and determining the next hop for said information content packet;
receiving an information query packet at one of said plurality of active network nodes, said information query packet including residual query data;
updating said at least one query ontology instance tree at one of said active network nodes with said query data from said information query packet; and
searching said at least one content ontology instance tree and determining the next hop for said information query packet.

13. The method as set forth in claim 12, wherein updating said at least one content ontology instance tree includes assigning confidence levels to nodes within said content ontology instance tree based upon said residual content data.

14. The method as set forth in claim 13, wherein updating said at least one content ontology instance tree further includes pruning branches of a content ontology instance tree based upon the confidence level of said nodes.

15. The method as set forth in claim 14, wherein a pruned content ontology instance tree is sent from one active node to neighboring active network nodes.

16. The method as set forth in claim 13, wherein the result said information content packet search of the at least one query ontology instance tree determines the next hop.

17. The method as set forth in claim 12, wherein updating said at least one query ontology instance tree includes assigning confidence levels to nodes within said query ontology instance tree based upon said residual query data.

18. The method as set forth in claim 17, wherein updating said at least one query ontology instance tree further includes pruning branches of a query ontology instance tree based upon the confidence level of said nodes.

19. The method as set forth in claim 18, wherein a pruned query ontology instance tree is sent from one active node to neighboring active network nodes.

20. The method as set forth in claim 17, wherein result from said information query packet search of the at least one content ontology instance tree determines the next hop.

21. The method as set forth in claim 12, wherein processing said information content packets includes creating additional information content packets for posting on alternate information routes.

22. The method as set forth in claim 21, wherein creating said additional information content packets further includes making a determination of resource credit allocation between said additional information content packets.

23. The method as set forth in claim 12, wherein processing said information query packets includes creating additional information query packets for searching alternate information routes.

24. The method as set forth in claim 23, wherein creating said additional information query packets further includes making a determination of resource credit allocation between said additional information query packets.

25. The method as set forth in claim 12, wherein said residual data deposited by said information content packet remains for a predetermined time period before disposal.

26. The method as set forth in claim 12, wherein said residual data deposited by said information query packet remains for a predetermined time period before disposal.

27. The method as set forth in claim 12, wherein the resource credit allocation of said information query packet increments or decrements as it traverses an active network node.

28. The method as set forth in claim 27, wherein said information query packet is deleted if its resource credit allocation decrements to zero.

29. The method as set forth in claim 12, wherein the resource credit allocation of said information content packet increments or decrements as it traverses an active network node.

30. The method as set forth in claim 12, wherein said information content packet is deleted if its resource credit allocation decrements to zero.

31. The method as set forth in claim 27, wherein multiple information query packets combine into a new single information query packet, and combine all resource credit allocations into said new single information query packet.

32. The method as set forth in claim 27, wherein multiple information content packets combine into a new single information content packet, and combine all resource credit allocations into said new single information content packet.

33. The method as set forth in claim 12, wherein said information content packets invoke pre-loaded functions that modify on said at least one content ontology instance tree and search said at least one query ontology instance tree at each of said active network nodes.

34. The method as set forth in claim 12, wherein said information query packets invoke pre-loaded functions that modify on said at least one query ontology instance tree and search said at least one content ontology instance tree at each of said active network nodes.

35. A computer system adapted to creating an information route in a plurality of active network nodes, each active node containing at least one content ontology instance tree and at least one query ontology instance tree, comprising:
  a processor;
  a memory including software instructions adapted to enable the computer system to perform:
    receiving an information content packet at one of said plurality of active network nodes, said information content packet including residual content data;
    updating said at least one content ontology instance tree at one of said active network nodes with said residual data from said information content packet;
    searching said at least one query ontology instance tree and determining the next hop for said information content packet;
    receiving an information query packet at one of said plurality of active network nodes, said information query packet including residual query data;
    updating said at least one query ontology instance tree at one of said active network nodes with said query data from said information query packet; and
    searching said at least one content ontology instance tree and determining the next hop for said information query packet.

36. A computer program product for enabling a computer to create an information route in a plurality of active network nodes, each active node containing at least one content ontology instance tree and at least one query ontology instance tree, comprising:
  software instructions for enabling the computer to perform predetermined operations, and a computer readable medium bearing the software instructions;
  the predetermined operations including the steps of:
    receiving an information content packet at one of said plurality of active network nodes, said information content packet including residual content data;
    updating said at least one content ontology instance tree at one of said active network nodes with said residual data from said information content packet;
    searching said at least one query ontology instance tree and determining the next hop for said information content packet;
    receiving an information query packet at one of said plurality of active network nodes, said information query packet including residual query data;
    updating said at least one query ontology instance tree at one of said active network nodes with said query data from said information query packet; and
    searching said at least one content ontology instance tree and determining the next hop for said information query packet.

37. A network of nodes for information searching, comprising:
  a plurality of information provider nodes, each having a plurality of stored information thereon;
  a plurality of information requestor nodes;
  a plurality of active network nodes, each active network node connected to a subset of said plurality of information provider nodes, a subset of said plurality of information requestor nodes and a subset of said plurality of active network nodes;
  a plurality of ontology instance trees, each one of said plurality of active network nodes having at least one content ontology instance tree and at least one query ontology instance tree, wherein each content ontology instance tree contains content data from information content packets and each query ontology instance tree contains query data from information query packets; and
  an active node service package at each one of said plurality of active network nodes for processing commands embedded within said information query packets and said information content packets.

38. The network as set forth in claim 37, wherein said network includes a plurality of computers interconnected via a physical network.

39. The network as set forth in claim 37, wherein said network includes a plurality of computers interconnected via a virtual network.

40. The network as set forth in claim 39, wherein said virtual network consists only of participating nodes within a plurality of computers.

41. The network as set forth in claim 37, wherein said network includes an Intranet.

42. The network as set forth in claim 37, wherein said network includes a plurality of computers interconnected via the Internet.

43. The method as set forth in claim 37, wherein the connected active network includes a routing tree for controlling routing among said plurality of active network nodes.

44. The method as set forth in claim 43, wherein said routing tree does not contain loops between the individual nodes of said plurality of active network nodes.

45. The network as set forth in claim 37, wherein said active node service package contains invocable pre-loaded functions at each of said active network nodes.

46. The network as set forth in claim 45, wherein said invocable pre-loaded functions operate on said at least one content ontology instance tree and said at least one query ontology instance tree at each of said active network nodes.

47. The network as set forth in claim 45, wherein said invocable pre-loaded functions support searching and modifying said at least one content ontology instance tree and said at least one query ontology instance tree at each of said active network nodes.

48. The network as set forth in claim 37, wherein said at least one content ontology instance tree at each of said active network nodes contains routing information indicating the path to the origin of said content packets.

49. The network as set forth in claim 48, wherein the branches of said at least one content ontology instance tree at each of said active network nodes have confidence levels assigned to the nodes of said content ontology instance tree based upon the content of said branches.

50. The network as set forth in claim 49, wherein each of said plurality of active network nodes prunes branches of a content ontology instance tree based upon the confidence level of said content ontology instance tree nodes.

51. The network as set forth in claim 50, wherein a pruned content ontology instance tree is sent to from one active network node to neighboring active network nodes.

52. The network as set forth in claim 37, wherein said at least one query ontology instance tree at each of said active network nodes contains routing information indicating the path to the origin of said query packets.

53. The network as set forth in claim 52, wherein the branches of said at least one query ontology instance tree at each of said active network nodes have confidence levels assigned to the nodes of said query ontology instance tree based upon the content of said branches.

54. The network as set forth in claim 53, wherein each of said plurality of active network nodes prunes branches of a query ontology instance tree based upon the confidence level of said query ontology instance tree nodes.

55. The network as set forth in claim 54, wherein a pruned query ontology instance tree is sent to from one active network node to neighboring active network nodes.

* * * * *